UNITED STATES PATENT OFFICE.

JEAN BILLITER, OF VIENNA, AUSTRIA-HUNGARY.

METHOD OF PURIFYING CARBON FOR CARBON FILAMENTS.

1,062,431.  Specification of Letters Patent.  Patented May 20, 1913.

No Drawing.  Application filed September 25, 1911. Serial No. 651,246.

*To all whom it may concern:*

Be it known that I, JEAN BILLITER, a citizen of the Empire of Austria-Hungary, and residing at 16 Pelikangasse, in the city of Vienna, Austria - Hungary, have invented certain new and useful Improvements in or Relating to Methods of Purifying Carbon for Carbon Filaments, of which the following is a specification.

The property of carbon filaments of gradually falling to dust when highly heated electrically limits the temperature to which they may be heated in carbon filament lamps, without shortening their life too much. This property is inconsistent with the other properties of carbon, which is known to be one of the least volatile substances, and which has hitherto never been fused with certainty.

The applicant has succeeded in ascertaining by means of careful and painstaking experiments, that such falling to dust of the carbon filaments is mainly caused by impurities which are contained in all known carbon or graphite filaments. He has found that even very small quantities of impurities, even still smaller than all hitherto known carbon filaments contained, will suffice to cause such gradual falling to dust. This may be easily explained by the fact that almost all such impurities will assume a gaseous form from a temperature of 2000° C. upward. If now the carbon filament contains even 1% of such impurities—and such a substance is generally considered as chemically pure—the gases will assume such a volume that they will disintegrate the carbon filament. Of course, the impurities are not gathered in one place, but distributed throughout the whole material, and therefore the filament will be disintegrated gradually and not all of a sudden. A preliminary heating of the filament to temperatures above 3000° C., as has been occasionally employed for purifying the filament, will not therefore prevent the subsequent gradual disintegration of the filament to dust when in the lamp.

Contrary to all filaments hitherto known the carbon filaments made from the purified carbon of the present invention contain less than 0.1% impurities and at least 94% of the carbon in form of graphite. The purified carbon is therefore an entirely novel material, and leaves no ash skeleton.

In the following the methods will be briefly indicated, by means of which such a purity of the carbon can be obtained. The carbon or graphite, which has been purified as highly as possible, is transferred into a colloidal form (this signifies the form in which carbon or graphite will remain in suspension for days or weeks without precipitating). The materials may be thus freed of a great part of their impurities, as these do not assume a colloidal form and may be separated by suction or ultra filtration. Indeed, the single particles of the colloid still consist of a number of molecules and these particles will therefore always still include a small percentage of impurities. The transfer into the colloidal form is therefore, preferably, repeated several times and combined with purifying processes. Only by such means is it possible to obtain carbon which is pure according to such methods.

To convert the carbon or graphite into the colloidal form, the material is for instance heated by a current until it disintegrates to dust. For completely removing the impurities this process must generally be repeated. For still further purifying the material, it is also advisable to employ a treatment with fluorin, which may be assisted by a moderate heating. Thus for instance the carbon in the form of filaments may be anodically polarized in hydrofluoric acid of fluorid. Care must be taken, that any traces of impurities consist of substances which are not noticeably volatile at a temperature of 2000° C., such as tungsten, tungsten carbid, vanadium carbid and others.

The essential feature of the hereinbefore described improvements consists in the production of carbon, which contains contrary to the all hitherto known kinds, less than 0.1% of impurities.

A second essential feature consists in the use of very fine or colloidal disintegration of the material.

I claim:

1. A method to obtain a carbon containing less than one-tenth of one per cent. impurities, which comprises transferring the carbon into colloidal carbon, by disintegration, and thereafter separating the colloidal carbon.

2. A method to obtain carbon containing less than one-tenth of one per cent. impurities, which comprises transferring the carbon into colloidal carbon, by disintegration with an electric current and thereafter separating the colloidal carbon.

3. A method to obtain carbon containing less than one-tenth of one per cent. impurities, which comprises transferring the carbon into colloidal carbon, by heat disintegration, repeating the disintegration, and thereafter separating the colloidal carbon.

In testimony whereof I have affixed my signature in presence of two witnesses.

JEAN BILLITER.

Witnesses:
 AUGUST FUGGER,
 ADA MARIA BERGER.

Copies of this patent may be obtained for five cents each, by addressing the "Commissioner of Patents, Washington, D. C."